May 26, 1959 E. R. WORTH, SR., ET AL 2,888,047
REMOTE CONTROL OF SAWMILL SETWORKS BY ELECTRO-MECHANICAL MEANS
Filed Oct. 24, 1955 3 Sheets-Sheet 1

INVENTORS
Elmer R. Worth, Sr.
BY Eric A. Petre

Agent

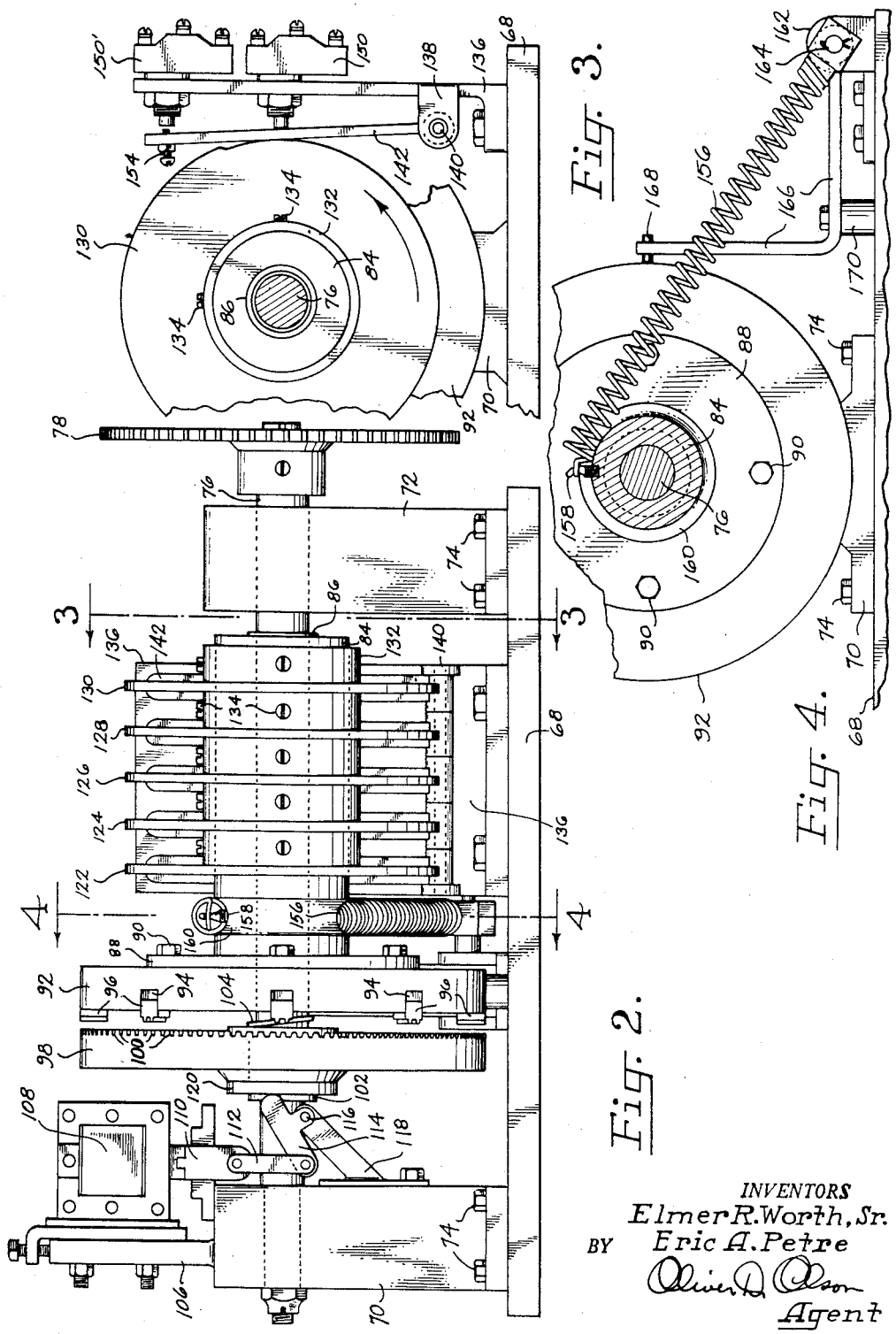

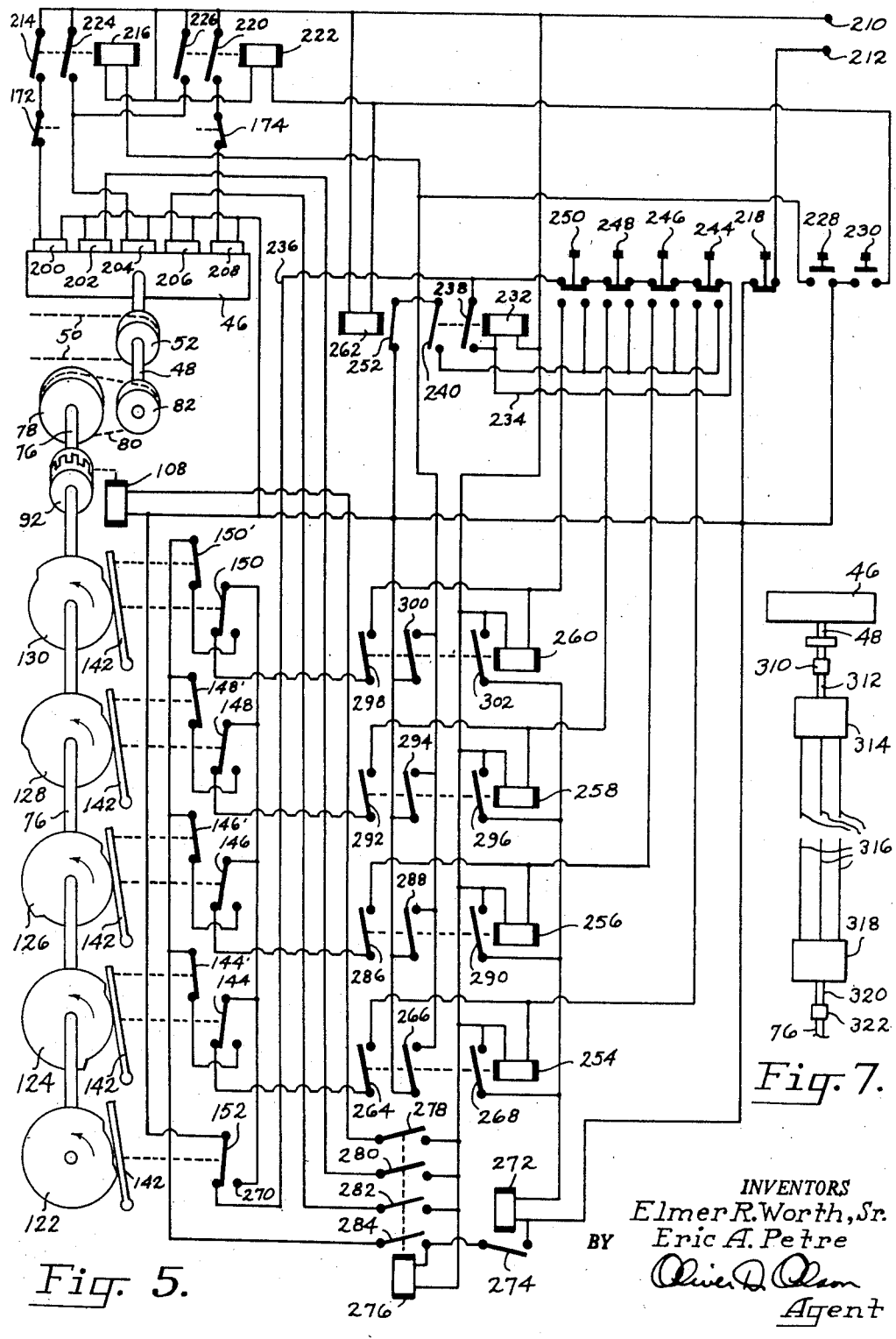

United States Patent Office 2,888,047
Patented May 26, 1959

2,888,047

REMOTE CONTROL OF SAWMILL SETWORKS BY ELECTRO-MECHANICAL MEANS

Elmer R. Worth, Sr., and Eric A. Petre, Salem, Oreg.; said Petre assignor to said Worth, Sr.

Application October 24, 1955, Serial No. 542,249

8 Claims. (Cl. 143—120)

This invention pertains to setworks, and relates particularly to the novel construction of a sawmill setworks by which the operation of a sawmill carriage assembly may be controlled with speed and precision from a remote position.

There are many types of machines in each of which the fundamental basis of operation involves the relative adjustment between a work support and a cooperating working tool. In some machines this adjustment is afforded by movement of the work support relative to a fixed working tool, while in other machines the working tool is adjustable with respect to a fixed work support. Still other machines provide for movement of both the work support and the working tool. In general such movement of working parts is achieved by the rotation, i.e. angular displacement, of a driven shaft, and it is to this type of machine that the present invention is applied with particular advantage.

For purposes merely of illustration the present invention is described hereinafter with particular reference to sawmill setworks. Since, as explained hereinbefore, various other types of machines operate upon the same basic principle, the specific reference to sawmill setworks is not intended as a limitation upon the scope of this invention.

Briefly, the construction and operation of a conventional sawmill carriage assembly is as follows: The carriage is a wheeled framework supported upon spaced rails which guide the carriage back and forth past a power driven saw. The carriage includes a plurality of spaced head blocks upon which to support a log. Retractable dogs secure the log releasably in abutment with knees which are mounted slidably upon the head blocks and are coupled to a power driven set shaft through lead screws or knee chains. By selective rotation of the set shaft, as controlled by the operator, the knees and hence the log are moved forward or rearward with respect to the saw.

The selective control of the set shaft is achieved by means of setworks, many types of which are well-known in the art. One specific type of setworks, over which the present invention is an improvement, is disclosed in U.S. Patent No. 2,661,036. In the operation of the setworks of said patent, accurate and reproducible results are obtainable when the setworks is adjusted for and is used with logs of consistent size. However, inaccurate settings are obtained when logs of different size, different thicknesses of bark, and different weight are being operated upon. These inaccuracies are believed to result from variations of inertia presented to the drive motor due to the variations in physical characteristics previously mentioned.

It is a principal object of the present invention to provide a setworks in which the precision of control is not influenced by the variations in physical characteristics of logs being operated upon.

Another important object of this invention is the provision of a setworks which affords operation of the sawmill carriage assembly from the safety of a position remote from the carriage.

A further important object of this invention is the provision of a setworks in which adjustment for each succeeding cut of the log is made merely by pressing properly identified push buttons.

Still another important object of the present invention is the provision of a setworks which affords complete control of the sawmill carriage assembly by but a single operator, thereby obviating the loss of time and the presentation of hazards ordinarily attending the operation of a carriage equipped with on-carriage setworks.

A general object of this invention is the provision of a device for controlling from a remote position the precise operation of an electrically actuated motor.

A still further object of this invention is to provide a setworks constructed of a minimum of parts for economical manufacture, which is sturdily built for long operating life and which is capable of effecting rapid and precise adjustment of the set shaft.

The foregoing and other objects and advantages of the present invention will appear from the following detailed description, taken in connection with the accompanying drawings, in which:

Figure 2 is a view in side elevation showing structural details of a setworks embodying the features of the present invention;

Figure 3 is a fragmentary sectional view taken along the line 3—3 in Figure 2 and showing a preferred form of cam operating means for the electrical switches in the electrical control circuit of the setworks;

Figure 4 is a fragmentary sectional view taken along the line 4—4 in Figure 2 and showing a preferred construction of the mechanism for returning the cam assembly to its normal rest position;

Figure 5 is a schematic diagram of an electrical control circuit for the setworks mechanism;

Figure 7 is a foreshortened fragmentary schematic diagram illustrating an alternative arrangement for interconnecting the setworks control and the set shaft drive motor.

Figure 1:
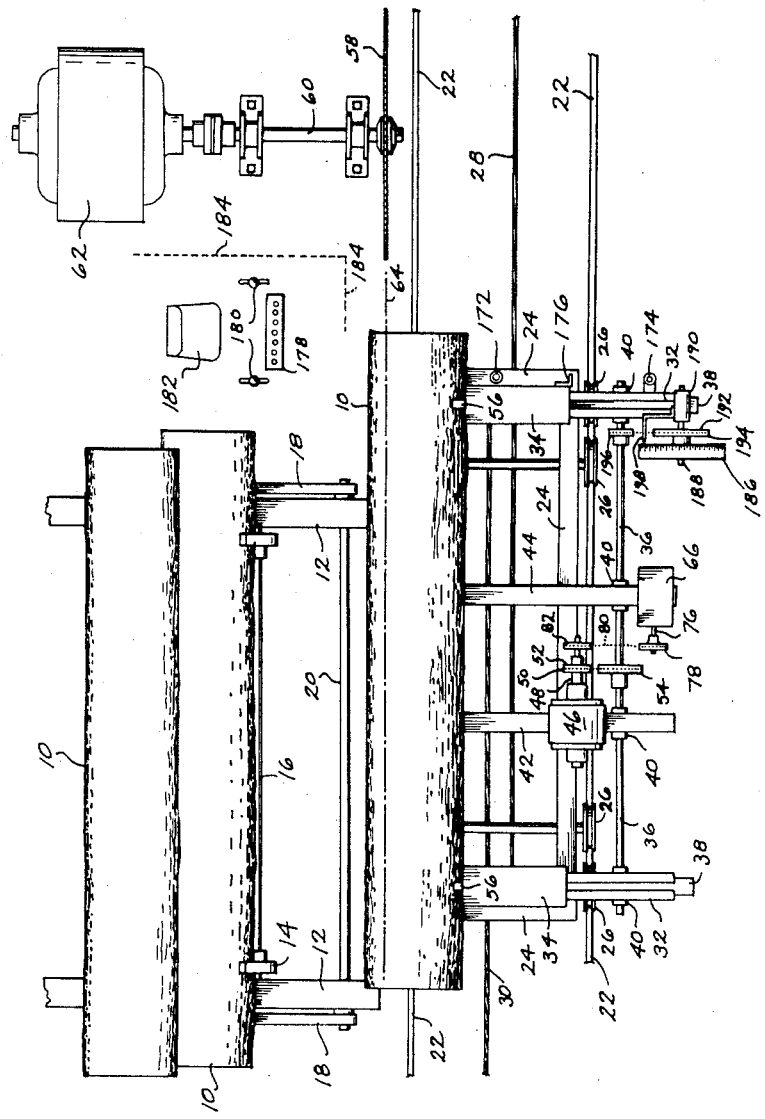
Figure 1 is a fragmentary plan view of a sawmill, showing incorporated therewith a setworks embodying the features of the present invention.

Referring particularly to Figure 1 of the drawings, there is shown for purposes of illustration the general details of one form of conventional sawmill. The sawmill includes a log deck upon which logs 10 are deposited, as from a mill pond, preparatory to cutting. The log deck comprises the spaced deck skids 12, the cradle type stop and loaders 14 secured to the shaft 16, and the log loaders 18 secured to the shaft 20. The shafts 16 and 20 are driven by motor means (not shown) in manner well-known in the art.

Adjacent the forward end of the log deck and extending perpendicularly with respect thereto is a pair of spaced parallel rails 22. A log carriage framework 24 is supported upon the rails by wheels 26, and is drawn forwardly and rearwardly thereon by cables 28 and 30, respectively, each of which is secured at one end to the carriage framework and at the other end to a power winch (not shown).

Extending transversely of the carriage framework are spaced head blocks 32, upon which a log may be deposited from the log deck. An upstanding knee 34 is supported slidably upon each head block for longitudinal movement over the latter. The knees are connected to a power driven set shaft 36 by any conventional means such as the lead screws 38 or knee chains. The set shaft extends longitudinally of the carriage and is journalled in bearings 40 supported by the head blocks and by the intermediate frame members 42, 44.

In the carriage assembly illustrated the set shaft is driven by means of an air motor 46 mounted upon the frame member 42. The motor drive shaft 48 is coupled to the set shaft by chain 50 reeved over sprockets 52 and 54 secured, respectively, to the motor drive shaft and to the set shaft. It will be apparent to those skilled in the art that an electric or other type of drive motor may be substituted for the air motor illustrated, and that various other types of coupling means may be employed, as desired.

The log is arranged upon the head blocks in abutment with the knees 34, and is secured releasably in that position by the retractable dogs 56 mounted in the knees. In this manner the log is rendered movable with the knees as the latter are actuated by rotation of the set shaft.

A saw blade 58 is arranged adjacent the forward rail in such manner as to clear the head blocks as the carriage is moved along the rails. The saw blade illustrated in Figure 1 is of the circular type mounted upon an arbor 60 which is driven by motor 62. It will be understood by those skilled in the art that other types of saw blades, such as the band saw blade, may be employed as desired.

Preparatory to cutting the log, the knees are moved forward, i.e. toward the saw blade, a distance sufficient to cause the log to intercept the plane 64 of the saw blade to the extent required for making the desired slab cut, as indicated by the dot dash and dash lines in Figure 1. This controlled movement of the knees is effected by the selective rotation of the power driven set shaft, and it is this rotation of the set shaft that is regulated by setworks.

In Figure 1 of the drawings the operating unit of the present setworks is illustrated generally by reference numeral 66. This unit is mounted upon the intermediate frame member 44 of the carriage. Referring now to Figures 2, 3 and 4 the mechanism of the operating unit is shown mounted upon a base plate 68. It will be understood, of course, that this mechanism is enclosed in a covering shield prior to installation, to protect the parts from damage due to dirt, dust, flying objects, and the weather.

A pair of standards 70 and 72 are mounted adjacent the opposite ends of the base plate and are secured thereto by such means as the bolts 74. Axially aligned bearings are mounted in the upper ends of the standards for supporting the elongated shaft 76 rotatably therebetween. One end of the shaft extends outwardly beyond the housing to accommodate attachment of sprocket 78 which, as shown in Figures 1 and 5, is connected through chain 80 to a sprocket 82 secured to the drive shaft 48 of air motor 46.

Mounted freely upon the shaft 76 intermediate the spaced standards is a sleeve 84, one end of which is positioned in abutment with a snap ring 86 retained removably in an annular groove formed in the shaft 76. The opposite end of the sleeve is provided with a radially extending flange 88 to which is secured, by such means as the bolts 90, one section 92 of a gear clutch. This clutch section is provided at circumferentially spaced intervals with radially extending grooves 94 proportioned to receive the gear tooth segments 96. These segments are mounted in the grooves resiliently in such manner as to urge the segments toward the second section 98 of the gear clutch. This second section is provided with gear teeth 100 arranged circumferentially in the surface facing the tooth segments 96.

The second section 98 of the gear clutch is keyed to the shaft 76 by spline 102, for longitudinal sliding movement. A spring 104 encircles the shaft between the two sections of the gear clutch, whereby to urge said clutch sections away from each other.

The pedestal 70 is provided with an extension 106 which forms a support for the solenoid 108. The armature 110 of the solenoid extends downwardly and is connected pivotally through link 112 to one end of the clutch actuating lever 114. This lever is mounted intermediate its ends, by pivot pin 116, upon a bracket 118 which is secured to the pedestal 70. The free end of the lever 114 abuts against the hub 120 of the clutch section 98. Thus, it will be apparent that upward movement of the solenoid armature (Figure 2) causes clockwise rotation of the lever 114, whereupon the clutch section 98 is moved toward the right into engagement with the tooth segments 96 carried by the clutch section 92. In this manner the clutch section 92 and the attached sleeve 84 is connected releasably to the shaft 76.

Mounted upon the sleeve 76 is a plurality of cam members 122, 124, 126, 128 and 130, each of which is provided with a projecting hub 132 which carries one or more set screws 134 adapted releasably to engage the sleeve and to secure the cam members thereto. Each cam member is provided with a projecting segment, best shown in Figures 3 and 5.

Mounted upon the base plate 68 adjacent the cam assembly is a switch support 136. A pair of brackets 138 project from the side edges of the switch support, and function to support therebetween the pivot pin 140. Mounted upon the pivot pin are a plurality of elongated finger elements 142, each of which is positioned in abutment with the peripheral surface of one of the cam members.

The switch support serves as a mounting for a plurality of microswitches, which, as shown in Figure 3, are arranged in pairs, one above the other, with the switch plungers positioned for contact by one of the fingers 142 associated with the pair. Thus, as indicated in Figure 5, the pair of microswitches 144 and 144' are associated with cam member 124; microswitches 146 and 146' are associated with cam member 126; microswitches 148 and 148' are associated with cam member 128; and microswitches 150 and 150' are associated with cam member 130.

Also mounted on the switch support 136 adjacent the cam member 122 is a single microswitch 152 (Figure 5). This is a safety switch, the function of which is described in detail hereinafter.

There is preferably provided on each of the fingers 142 an adjustable contact screw 154 mounted adjacent the plungers of the upper row of microswitches, to accommodate a degree of adjustment in the actuation of said microswitches by the cam members.

Means is provided for maintaining the cam members in a normal rest position with respect to the associated microswitches and to return said cam members to said normal rest position after rotation. In the embodiment illustrated, this means includes an elongated spiral spring 156 which is secured at one end to a pin 158 secured to the sleeve 84 at the center of an annular guide groove 160. The opposite end of the spring is secured to a bracket 162 mounted upon the base plate 68. Mounted pivotally on this bracket, by means of pivot pin 164 is an angular stop member 166. The upper end of the stop member is provided with a notch in which to receive a pin 168 (Figure 4) secured to the periphery of the clutch section 92. A bumper element 170, constructed of a resilient material such as nylon, rubber, or other suitable material, is secured to the stop member adjacent the intermediate bend therein. The bumper element is adapted to rest upon the base plate 68 and to absorb the shock of pin 168 returning to the notch in the stop member as the cam assembly is returned to its normal rest position by spring 156.

Referring now to Figure 1 of the drawings, the freely rotating shaft 76 is connected at one end to the drive shaft of the set shaft air motor 46, as explained hereinbefore. By the virtue of the positive coupling between the knees 34 and the set shaft 36, as afforded by the lead screws 38, there is established a definite relationship between the linear distance through which the knees travel per revolution of the set shaft. Accordingly, since the set shaft is coupled through the drive shaft of the air motor to the shaft 76 of the setworks mechanism, there is established a definite relationship between the linear movement of the knees per degree of rotation of said setworks shaft. Thus, for example, with the safety microswitch 152 in the normal rest position shown in Figure 5, the angles formed from the axial center of shaft 76 between the safety microswitch and the microswitches 144', 146', 148' and 150', may represent forward movements of the knees of 3, 4, 5, and 6 inches, respectively. Thus, the mechanical assembly illustrated in the drawings provides four different settings of the knees, thereby accommodating the cutting of logs to any one of four different thicknesses. It will be apparent that the number of different sizes of cuts may be varied by provision of appropriate numbers of cam and switch assemblies.

In Figure 1 there is shown a forward limit switch 172 and a reverse limit switch 174 mounted upon elements of the carriage framework adjacent the right hand knee. These switches are arranged in the circuits of the drive motor control, as shown in Figure 5. A finger 176 projecting laterally from the knee is arranged to contact the forward and reverse limit switches at the extreme limits of travel of the knees. Thus, upon contact of the finger with either switch, the circuit to the drive motor 46 is opened and rotation of the set shaft 36 is stopped. In this manner the linear travel of the knees is restricted to the length of the head blocks, or to any shorter distance desired.

A control panel 178 is located conveniently between the log deck and the saw blade 58, and preferably is arranged slightly forward of but between the spaced levers 180 by which the operator controls the movement of the log deck and carriage assembly from his position in seat 182. The control panel, the levers and seat may be shielded, if desired, by the protective walls indicated by the dotted lines 184, to insure the operator against injury from flying particles.

Mounted upon the carriage is a reference dial 186. This dial is mounted upon shaft 188 journaled for rotation in bearing 190, secured to an upright support of the carriage. A sprocket 192, secured to said shaft, is connected through chain 194 to sprocket wheel 196 mounted upon the set shaft 36. An index pointer 198 is mounted upon the upright support for registry with the dial. By proper selection of sprocket wheels the indicated graduations on the reference dial under the index pointer identifies the number of inches separating the knees and the plane of the saw blade.

Mounted in the top of the control panel 178 are a plurality of electric push button switches by means of which the operation of the setworks mechanism is controlled by the operator. These push buttons are shown in Figures 1 and 5 as being seven in number, to accommodate the cutting of logs into four predetermined dimensions of boards, as exemplified hereinbefore, and to provide manual forward and reverse operation and an emergency stop control. The function and operation of the push button switches are described in detail hereinafter.

Referring now to Figure 5 of the drawings, there is shown a diagram of an electrical system by which the several elements of the setworks may be interconnected for operation. In the embodiment illustrated, the set shaft motor 46 is shown to be an air motor controlled selectively by a high speed forward solenoid 200, a low speed forward solenoid 202, exhaust solenoid 204, auxiliary exhaust solenoid 206, and the reverse solenoid 208. The high speed solenoid is connected from the 110 volt supply line 210 through the normally open breaker contact 214 of the forward relay coil 216, through the normally closed forward knee limit switch 172 and the normally closed emergency stop switch 218 to supply line 212. Similarly, the reverse solenoid 208 is connected from supply line 210 through the normally open breaker contact 220 of the reverse relay coil 222, through the normally closed reverse knee limit switch 174, and the emergency stop switch 218 to line 212. The exhaust solenoid 204 is connected to the supply lines through either of the normally opened breaker contacts 224 or 226 of the respective forward and reverse relay coils 216 and 222, and the emergency stop switch 218. Thus, the exhaust solenoid is actuated simultaneously with either the forward or reverse solenoids.

The forward relay coil 216 is connected from supply line 210 through the normally closed forward knee limit switch 172, through the normally opened forward manual push button switch 228 and the normally closed emergency stop push button switch 218 to supply line 212. In similar manner, the reverse relay coil 222 is connected from supply line 210 through the reverse knee limit switch 174, through the normally opened reverse manual push button switch 230 and the normally closed emergency stop push button switch 218 to supply line 212.

A safety relay coil 232 is energized by a circuit completed from supply line 210 through line 234 and the normally closed contact positions of the control push button switches 244, 246, 248 and 250, through line 236 and the safety microswitch 152 when closed by safety cam 122 in the normal rest position of the cam assembly, and thence through the normally closed emergency stop push button switch 218 to supply line 212. It is to be observed that, in the normal rest position of the cam assembly, the above circuit is complete and the safety relay coil 232 is energized. It is evident, however, that when the safety cam 122 opens the normally closed position of the safety microswitch 152, the circuit of the safety relay coil 232 is opened.

Upon energization of the safety relay coil 232, the holding contact 238 is closed to complete a circuit arranged in parallel with the control push button switches. In this manner any of the latter switches thereafter may be depressed without opening the circuit of the safety relay coil.

Energization of the safety relay coil also closes the contact 240 which completes the circuit of any one of the control push button switches when in the depressed position. For example, the circuit of the depressed control push button switch 244 is completed from supply line 212 through the emergency stop switch 218, through the normally closed reverse lock-out contact 252, through the closed safety contact 240 and the depressed push button switch 244 and thence through the control relay coil 254 to supply line 210. Thus, it will be apparent that depression of switch 244 effects energization of coil 254.

In similar manner, depression of control push button switches 246, 248 and 250 effects energization of control relay coils 256, 258 and 260, respectively.

It is to be noted that the closing of the reverse manual push button switch 230 completes a circuit from supply line 210 through the reverse lock-out relay coil 262, through the reverse knee limit 174 and the depressed reverse manual push button switch 230, thence through the emergency stop push button switch 218 to supply line 212. Thus, when the reverse push button switch is closed to energize the reverse relay coil 222, the reverse lock-out relay coil 262 is also energized and the lock-out switch 252 is opened to break the circuits of all of the control push buttons for their depressed positions. This arrangement insures against the energization of the clutch solenoid when the knees are being retracted, and thereby prevents possible damage to the setworks mechanism. It is to be noted further that the closing of the forward manual push button switch 228 does not activate the control relay coils, nor the clutch solenoid 108.

Upon energization of control relay coil 254 the normally opened contacts 264, 266 and 268 are caused to close. The closing of holding contact 264 completes a circuit from line 210 through coil 254 and contact 264, through the normally closed terminal of microswitch 144, thence through the normally open terminal 270 of safety microswitch 152 and emergency stop push button switch 218 to supply line 212.

The closing of contact 266 completes the circuit from supply line 210 through the forward high speed relay coil 216 and forward knee limit switch 172 and emergency stop switch 218 to supply line 212.

The closing of contact 268 completes a circuit from supply line 210 through delay coil 272 and the emergency stop switch 218 to supply line 212. Energization of the delay coil causes the associated delay switch 274 to close, thereby completing the electrical circuit of the follow-up relay coil 276, through the emergency stop switch 218. Energization of the follow-up relay coil 276 causes the normally open contacts 278, 280, 282 and 284 to close.

With the closing of contact 278, a circuit is completed from supply line 210, through said contact and the clutch solenoid 108, through the emergency stop switch 218 to supply line 212. The closing of contact 280 completes a circuit from supply line 210 through said contact and the low speed forward solenoid 202, through the emergency stop switch 218 to supply line 212. Closing of contact 282 completes a circuit from supply line 210 through the auxiliary exhaust solenoid 206 and emergency stop switch 218 to supply line 212.

Contact 284 is arranged in a circuit which extends from supply line 210 through the follow-up relay coil 276 and said contact 284, to any one of the follow-up microswitches 144'—150'. Each of these microswitches is connected in series with the normally open terminals of the associated high speed control microswitches 144—150, and thence through the normally open terminal 270 of the safety microswitch 152, through the emergency stop switch 218 to supply line 212.

The action described above by energization of control relay coil 254 also obtains with the energization of control relay coils 256, 258 and 260. In these latter instances the action is obtained through closing of the contacts 286, 288 and 290 associated with coil 256; contacts 292, 294 and 296 associated with coil 258; or contacts 298, 300 and 302 associated with coil 260.

As explained hereinbefore, the closing of any one of the holding contacts 264, 286, 292, 298 completes a circuit through the associated high speed control microswitches 144—150 when the safety microswitch 152 is moved to the normally open terminal 270. These circuits shunt the respective control push button switches 244—250. Thus, the normally closed microswitches maintain their respective control relay coils energized after the associated control push buttons have been released. It is evident, therefore, than any control relay coil previously energized by depression of the associated control push button will become deenergized when its associated high speed microswitch is opened upon contact of the associated cam member 124—130.

Deenergization of any one of the control relay coils 254—260 causes opening of the associated contact 268, 290, 296, 302, respectively, with the consequent deenergization of the delay coil 272 and the opening of delay switch 274. However, the electrical circuit of the follow-up relay coil 276 is still completed through the holding circuit including switch 284 and the appropriate pair of high speed and follow-up microswitches, and the safety microswitch 152. Accordingly, although deenergization of the high speed control relay coil breaks the circuit of the forward relay coil 216 and hence the forward high speed solenoid 200 and exhaust solenoid 204, the circuits of the forward low speed solenoid 202 and auxiliary exhaust solenoid 206 are maintained closed, through the closed contacts 280 and 282, respectively. The circuit of the clutch solenoid 108 also is maintained closed through contact 278. These circuits are held closed until the appropriate cam member actuates the low speed follow-up microswitch associated with the control push button switch which previously had been selected and depressed.

From the foregoing, it will be understood that the circuits of the high speed microswitches 144—150 control the operation of the high speed forward solenoid 200 to move the knees forward rapidly to a position just short of the desired position of set. At this point the appropriate cam member engages the finger 142 and opens the circuit of the appropriate high speed microswitch. Thereupon the circuit of the high speed forward solenoid 200 is broken, and the set shaft air motor 46 is caused to be driven only through control by the low speed forward solenoid 202. Thus, the knees are driven forwardly at a slow rate of speed for the final fraction of an inch, and then the cam member opens the associated follow-up microswitch, breaking the circuits of the low speed forward solenoid 202, the auxiliary exhaust solenoid 206, and the clutch solenoid 108.

The operation of the setworks described hereinbefore is as follows: Let it be assumed, for purposes of this description, that the operator contemplates the cutting of logs into the various dimensions of 2⅔, 3⅔, 4⅔ and 5⅔ inches, and that the width of the saw blade 58 is ⅓ inch. Since the width of the saw kerf must be accounted for in each cut, the respective forward movement of the knees necessary to produce the above desired cuts are 3, 4, 5 and 6 inches. Assume further, therefore, that the high speed microswitches 144—150 are to be actuated by the associated cam members 124—130 when the knees have been moved forwardly to a position ⅛ inch from the final set, and that the low speed follow-up microswitches 144'—150' are to be actuated by the associated cam members when the knees have been moved forwardly the distances of 3, 4, 5 and 6 inches, respectively. These adjustments are made by loosening the set screws 134 on the cam hubs 132 and rotating the cams until they are positioned angularly with respect to the safety switch cam 122 to provide the required forward linear movement of the knees on the head blocks. Final precise adjustment of the follow-up microswitches may be made by the adjustable contacts 154 on the fingers 142.

Assume further that the knees are presently disposed closely adjacent the plane 64 of the saw blade, and therefore must be retracted preparatory to the deposit of a log upon the head blocks. By visual inspection the operator estimates the diameter of the log to be about three feet. Accordingly, since the knees are to be retracted, the operator depresses the reverse push button 230. Thereupon, the circuit of reverse relay coil 222 is completed and the contacts 220 and 226 are closed. The 110 volt circuits of the respective reverse and exhaust solenoids 208 and 204 are thereby energized and the air motor 46 is operated to rotate the set shaft 36 in the direction for retracting the knees. The setworks shaft 76 rotates with the set shaft, as previously explained. However, simultaneous with the energization of the reverse relay coil 222, the closure of the reverse push button switch 230 closed the circuit of the reverse lock-out relay coil 262. The lock-out switch 252 was thereby opened to prevent accidental energization of the clutch solenoid 108.

While maintaining the reverse push button switch closed, the operator watches the reference dial 186. Then, as the numerical value of 36 inches on the dial registered with the index pointer 198, the operator releases the reverse push button. The knees thus have been retracted to a position 36 inches from the plane of the saw blade, as was desired.

With the carriage arranged in position adjacent the log deck, the operator now manipulates the levers 180 to deposit a log upon the head blocks and to secure it in positive abutment with the knees, in conventional manner.

Let it now be assumed that it is necessary to draw the log forwardly, i.e. toward the plane of the saw blade, in order to make the initial slab cuts. Accordingly, the operator depresses the forward push button 228. This energizes the forward relay coil 216 which closes the contacts 214 and 224 in the 110 volts supply line of the respective forward and exhaust solenoids 200 and 204 of the air motor 46. The set shaft 48 rotates and draws the knees and log forwardly. When sufficient thickness of log has been drawn across the plane of the saw blade to make the desired slab cut, the operator releases the forward push button. The air motor is thereby deactivated, the rotation of the set shaft is stopped and the forward movement of the log is halted.

By manipulation of the levers 180, the operator moves the carriage forwardly upon the rails 22, whereby the saw blade engages the log and makes the desired slab cut. The operator now manipulates the levers to draw the carriage rearwardly to its initial starting position. It is to be assumed that the operator will repeat the foregoing procedure after turning the log through successive 90 degree stages, to remove the four quadrant slab cuts and produce a square cant, the forward edge of which now lies in the plane of the saw blade. Assume further that the value of 28 inches on reference dial 186 registers with the index pointer. This indicates to the operator that the thickness of the cant is 28 inches.

Let it now be assumed that the operator wishes to cut from the square cant a board having a thickness of 4⅔ inches. Since, in this example, the width of the saw blade is ⅓ inch, the total forward movement of the knees required for producing this board is 5 inches. This dimension corresponds to the angular position of microswitch cam 128 relative to the safety microswitch cam 122. Since microswitch 148 is arranged in the circuit of control push button switch 248, the operator will depress the latter for moving the knees forwardly a distance of 5 inches.

Prior to depressing the control push button the electrical system is in the condition shown in Figure 5. In this condition the safety microswitch 152 is closed by virtue of its contact with the safety cam 122, the cam assembly being at its normal rest position with pin 168 resting in the notch of the stop member 166.

With the safety microswitch 152 closed, the safety relay coil 232 is energized and the contacts 238 and 240 are closed.

The operator now depresses the control button 248 and thereby completes the circuit of control relay coil 258, as explained hereinbefore. Upon energization of the control relay coil the contacts 292, 294 and 296 are closed simultaneously.

The closure of contact 296 completes the circuit of the delay coil 272, thereby closing delay switch 274 and completing the circuit of follow-up relay coil 276. With the energization of the follow-up relay coil the closure of contact 278 completes the circuit of the clutch solenoid 108, whereupon its armature 110 is drawn upwardly (Figure 2) and the clutch section 98 is moved to the right into engagement with the tooth segments 96 carried by clutch section 92, which is connected through sleeve 84 to the cam assembly.

Simultaneous with the activation of the clutch solenoid the closure of contact 294 completes the circuit of the forward high speed solenoid 200 and the closure of contact 280 completes the circuit of the forward low speed solenoid 202, as previously explained. The air motor 46 is thereby activated to rotate the set shaft at high speed in the direction for moving the knees forwardly toward the plane of the saw blade.

By virtue of the positive coupling between the set shaft 36 and the setworks shaft 76 through the drive shaft of the air motor, the setworks shaft rotates simultaneously with the set shaft. Thus, since the sections 92 and 98 of the clutch have been drawn together, the cam assembly is caused to rotate simultaneously with the setworks shaft and set shaft.

As the knees progress forwardly, the cam assembly rotates in a counterclockwise direction indicated by the arrows in Figures 3 and 5. The safety cam member 122 immediately moves the safety microswitch 152 from the normally closed position to the normally opened terminal 270. In moving from the normally closed position the circuit of the safety relay coil 232 is opened, the contacts 238 and 240 are opened and the circuits of the control push button switches 244—250 for their depressed position are opened, thereby rendering the latter incapable of energizing their respective cooperating control relay coils. This arrangement prevents the activation of the control relay coils by the control push buttons until the operating cycle presently in progress is completed.

The circuit of control relay coil 258 is now completed only through the microswitch 148 and the closed contacts 292, 152 and 218. The cam member 128 continues to rotate toward the microswitch 148. Although the cam members 124 and 126 successively engage and open the microswitches 144, 144′ and 146, 146′ during rotation of the cam assembly, the circuits of their cooperating relay coils 254 and 256, respectively, are not affected since they have not previously been energized through the control push button switches 244 and 246, respectively.

When cam member 128 rotates sufficiently for its projecting section to move the associated finger 142 sufficiently to actuate the plunger of microswitch 148, to move the latter from its normally closed contact to its normally open contact, the set shaft has caused the knees to be moved forward upon the head blocks a distance of 4⅞ inches. Upon such activation of microswitch 148 the circuit of control relay coil 258 is opened, releasing switch 294 and deenergizing the forward relay coil 216. Thus, contacts 214 and 224 are opened and the forward high speed solenoid 200 and exhaust solenoid 204 are deenergized.

Simultaneously with the deenergizing of control relay coil 258 the opening of switch 294 breaks the circuit of the delay relay coil 272, causing the delay switch 274 to open. Thus, the circuit of follow-up relay coil 276 is completed only through switch 284 and the follow-up microswitch 148′ in the series arrangement of high speed microswitch 148 in engagement with its normally open terminal, thence through the safety microswitch 152 in engagement with it normally open terminal 270, and emergency stop switch 218.

Since the low speed follow-up forward solenoid 202 and the auxiliary exhaust solenoid 206 are still maintained energized by virtue of the closed contacts 280 and 282 of the follow-up relay coil 276, the air motor is now powered at slow speed, and the set shaft rotates at a correspondingly lower speed to move the knees forwardly the final fraction of an inch at a reduced rate of speed.

As the knees are driven forward slowly toward the final set point, the cam member 128 continues its rotation slowly until the low speed follow-up microswitch 148′ is opened. At this instant the electrical circuit of the follow-up relay coil 276 is broken and the switches 278, 280 and 282 are opened to deenergize the clutch solenoid 108, the low speed forward solenoid 202 and the auxiliary exhaust solenoid 206, respectively. Thus, the air motor 46 is deenergized at the instant the knees have been moved to the precise final set point, with the face of the log extending beyond the plane of the saw blade a distance of exactly 5 inches.

With the deenergization of the clutch solenoid 108, the compression spring 104 exerts an outward force between the clutch sections 92 and 98, causing their separation. When the gear teeth 100 have been disengaged from the tooth segments 96, the spiral spring 156 causes immediate rotation of the clutch section 92 and the attached cam assembly in the direction returning the latter to its normal rest position, with pin 168 resting in the notch of the stop member 166.

The operator now manipulates the levers 180 to move the carriage forward over the rails 22 and thus cuts the board from the cant, after which the carriage is returned in the manner previously explained.

In the event the operator desires to cut several more boards of 4⅔ inches thickness, he merely depresses the same control push button 248 to repeat the cycle described hereinbefore. On the other hand, if it is desired to cut boards of either 2⅔, 3⅔ or 5⅔ inch thicknesses, the operator merely depressed the appropriate control push button 244, 246, or 250, respectively. The operating cycle for any of these is the same as the cycle previously described.

Figure 6:
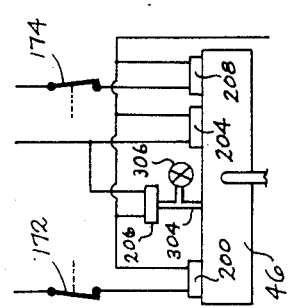
Figure 6 is a schematic diagram of an alternative form of electrical control circuit for the setworks mechanism.

In Figure 6 of the drawings there is shown a modified motor valve control and electrical circuit. In this construction, the slow speed forward solenoid 202 has been eliminated, and the auxiliary exhaust solenoid 206 is connected to the auxiliary exhaust of the motor through conduit 304 which carries a bypass bleeder valve 306. The auxiliary exhaust solenoid 206 is arranged electrically in parallel with the main exhaust solenoid 204. Further, since the slow speed forward solenoid 202 has been eliminated, the switch contact 280 of the follow-up relay 276 also has been omitted. Switch contact 282 of the follow-up relay coil 276 is connected to the high speed forward solenoid 200 in the line controlled by switch 214.

In this embodiment the air valve control system for motor 46 is of the conventional type wherein solenoid 200 controls both the forward intake and exhaust valves simultaneously, and solenoid 208 controls both the reverse intake and exhaust valves simultaneously. Solenoid 204 controls the motor exhaust valve which is common to both forward and reverse intake ports. This motor exhaust valve is in addition to the exhaust valves of the air valve control system.

The operations of the manual forward and reverse push button switches 228 and 230, respectively, of the circuit shown in Figure 6 is the same as that of Figure 5, with the exception that the auxiliary exhaust solenoid 206 is always actuated simultaneously with the main exhaust solenoid 204. The operating cycle of the selector push buttons 244—250 is modified to the following extent:

By depressing selector push button 244, for example, control relay coil 254 is energized, closing contact switches 264, 266 and 268. Delay relay coil 272 is energized, closing delay contact switch 274, and follow-up relay coil 276 is then energized, closing contact switches 278, 282, and 234, in the manner previously described. With the closing of contact switch 266, the circuit of forward relay coil 216 is completed and the contact switches 214 and 224 are closed, thereby completing the circuits of the high speed forward solenoid 200, the main exhaust solenoid 204 and the auxiliary exhaust solenoid 206. Simultaneously, the closing of follow-up switch 278 completes the circuit of the clutch solenoid 108, whereupon rotation of the drive shaft 48 of air motor 46 causes simultaneous rotation of the control shaft 76 and the cam assembly.

As cam member 124 engages and opens microswitch 144, the circuit of control relay coil 254 is opened, and the opening of contact switch 266 breaks the circuit of the forward relay coil 216. Consequently, contact switches 214 and 224 open, the latter switch breaking the circuit of the main exhaust solenoid 204 and the auxiliary exhaust solenoid 206.

The opening of contact switch 214 does not break the circuit of the high speed forward solenoid 200, however, since the circuit of the latter is now completed through contact switch 282 of the follow-up relay 276. Accordingly, the motor 46 continues to be driven from the source of compressed air (not shown) controlled by solenoid 200. However, the exhaust solenoids 204 and 206 have been deenergized, and therefore the exhaust ports have been closed, with the exception of the bypass bleeder valve 306. This valve is adjusted to permit the escape of exhaust to the atmosphere at a rate considerably lower than the rate of exhaust permitted when the exhaust solenoids are energized. Accordingly, the restricted escape of exhaust through the bypass valve 306 functions to brake the speed of the motor to the extent desired.

As the motor 46 continues to be driven at the slower rate of speed, cam member 124 continues its rotation until it opens the follow-up microswitch 144'. Thereupon the follow-up relay coil 276 is deenergized and the circuits of the clutch solenoid 108 and the high speed forward solenoid 200 are broken by the opening of contact switches 278 and 282, respectively.

Although the setworks control mechanism is shown in Figure 1 as being mounted upon the carriage adjacent the drive motor 46, it is to be understood that the unit may be removed to a position remote from the carriage, for example adjacent the control panel 178. In such cases, coupling between the drive shaft 48 of motor 46 and the control shaft 76 of the setworks may be made by means of Selsyn motors or other equivalent servo-type systems, in the manner illustrated in Figure 7. The drive shaft 48 of motor 46 is connected by flexible coupling 310 to the drive shaft 312 of the master Selsyn motor 314. Wires 316 interconnect the master Selsyn and a slave Selsyn 318, whose drive shaft 320 is connected through flexible coupling 322 to the shaft 76 of the setworks control mechanism.

From the foregoing detailed description, it will be apparent to those skilled in the art that the basic improvement provided by the present invention over the setworks described in the patent identified hereinbefore resides in the provision of means whereby operation of the set shaft motor may be effected at high speed for a majority of the distance of knee travel for a desired cut and then to complete the set by operating the set shaft motor at low speed for the remaining fraction of the distance. This mode of operation contributes significantly to the precision with which the sets may be made, since it effectively overcomes the factor of inertia presented by the varying physical characteristics of the log handled by the carriage. Furthermore, the present mode of operation permits a substantial increase in the speed of setting, since the initial operation of the set shaft motor may be effected at a rate of speed substantially greater than is capable with networks of the prior art.

It is believed that those skilled in the art will recognize many advantages of the present invention. When employed as setworks in sawmill operation, the required settings of the knees are made rapidly and with maximum precision, and with the facility of push button control. Lumber production is substantially increased, while the requirement for operating personnel is reduced to a single sawyer. Complete operating safety is afforded by removal of the push button control panel to a position remote from the carriage.

The present invention is readily adaptable for use with other than sawmill apparatus. In general, the present invention is capable of controlling the angular displacement or rotation of any shaft or other device driven by an electrically controllable motor. Thus, for example, the reference dial may be graduated in degrees to designate the angular rotation of a rotary shaft.

More generally, the present invention is capable of use in controlling the operation of an electrically actuated motor of any type wherein a relative displacement of a driven member may be employed to effect actuation of switching means in the circuit of the motor actuating means.

It will be apparent to those skilled in the art that means other than the cam operated microswitches illustrated may be used to control the electrical circuit of the motor actuating means. For example, appropriate adjustable elements of Wheatstone bridge circuits may be controlled by the operator and by the shaft 76, respectively, to provide initial conditions of electric potential unbalance corresponding to predetermined desired forward movements of the knees 34, whereby subsequent operation of shaft 76 brings the bridge circuit into electrical balance, the balancing of the circuit functioning to effect actuation of switch means in the motor actuating circuit to stop the motor. Since the bridge circuits function in the same manner as the microswitches, they are intended to be included in the general term of switch means as employed in the appended claims.

It will also be apparent that the presently described device may be employed to control the operation of a variable speed motor of the ram type, for example an hydraulic piston motor, wherein it is desired to control the longitudinal displacement of the piston shaft. In such instances, for example, the microswitches may be disposed in a line for engagement with a switch actuator which is carried on the movable piston shaft and connected releasably thereto by a solenoid-operated clutch, whereby to permit return of the actuator to a normal rest position. Alternatively, the assembly of cam members and microswitches illustrated may be used, and the shaft 76 coupled releasably to the longitudinally movable piston shaft through rack and pinion means or other appropriate means by which to provide axial rotation of the shaft 76 by proportionate longitudinal movement of the piston shaft.

Various other changes in the structural details illustrated and described hereinbefore may be made without departing from the scope and spirit of this invention. Accordingly, it is to be understood that the foregoing description is merely illustrative of the invention and is not to be considered as limiting the scope thereof.

Having thus described our invention and the manner in which the same may be used, what we claim as new and desire to secure by Letters Patent is:

1. A device for controlling the displacement of a shaft powered by an electrically actuated variable speed motor, said device comprising, in combination with an electric supply for actuating the driving of the motor at different speeds; a pair of supports, one of the supports being mounted for movement relative to the other support and having a normal rest position, coupling means releasably interconnecting the movable support and the shaft, first switch means mounted upon one of the supports and arranged in the circuit of the motor actuating means for driving the motor at a first speed, second switch means mounted upon one of the supports and arranged in the circuit of the motor actuating means for driving the motor at a second speed, the second switch means being paired with the first switch means, switch actuating means mounted upon the other support and displaced from the pair of first and second switch means when the movable support is in rest position, the first and second switch means of the pair being disposed for sequential contact with the switch actuating means upon a predetermined movement of the movable support, operating means connected to the coupling means for actuating the latter whereby to interconnect the movable support and shaft so that the displaced first and second switch means and the switch actuating means will be brought into mutual contact upon actuation of the motor and whereby to disconnect the movable support and shaft when the motor is stopped so that the first and second switch means and the switch actuating means may be displaced in proportion to the desired displacement of the shaft, and control switch means arranged in the circuit of the motor actuating means for activating the motor to move the shaft and movable support, the first switch means functioning upon engagement with the switch actuating means to deactivate the driving of the motor at said first speed, whereby the motor is continued to be driven at the second speed, the second switch means functioning upon engagement with the switch actuating means to deactivate the driving of the motor whereby to stop the movement of the shaft.

2. A device for controlling the displacement of a shaft powered by an electrically actuated variable speed motor, said device comprising, in combination with an electric supply for actuating the driving of the motor at different speeds; a pair of supports, one of the supports being mounted for movement relative to the other support and having a normal rest position coupling means releasably interconnecting the movable support and the shaft, a plurality of first switch means mounted upon one of the supports and arranged in the circuit of the motor actuating means for driving the motor at a first speed, a plurality of second switch means mounted upon one of the supports and arranged in the circuit of the motor actuating means for driving the motor at a second speed slower than the first speed, each second switch means being paired with one of the first switch means, switch actuating means mounted upon the other support and displaced from each pair of first and second switch means when the movable support is in rest position, the first and second switch means of each pair being disposed for sequential contact with the switch actuating means upon a predetermined movement of the movable support, operating means connected to the coupling means for actuating the latter whereby to interconnect the movable support and shaft so that the displaced first and second switch means and the switch actuating means will be brought into mutual contact upon actuation of the motor and whereby to disconnect the movable support and shaft when the motor is stopped so that the first and second switch means and the switch actuating means may be displaced in proportion to the desired displacement of the shaft, and a plurality of control switch means each arranged in the circuit of the motor actuating means for activating the motor to move the shaft and movable support, each first switch means functioning upon engagement with the switch actuating means to deactivate the driving of the motor at said first speed, whereby the motor is continued to be driven at the second speed, each second switch means functioning upon engagement with the switch actuating means to deactivate the driving of the motor whereby to stop the movement of the shaft after the latter has moved through the distance selected by the control switch means.

3. A device for controlling the displacement of a shaft powered by an electrically actuated variable speed motor, said device comprising, in combination with an electric supply for actuating the driving of the motor at different speeds; a pair of supports, one of the supports being mounted for movement relative to the other support and having a normal rest position, electrically actuated coupling means releasably interconnecting the movable support and the shaft, first switch means mounted upon one of the supports and arranged in the circuit of the motor actuating means for driving the motor at a first speed, second switch means mounted upon one of the supports and arranged in the circuit of the coupling actuating means and the motor actuating means for driving the motor at a second speed, the second switch means being paired with the first switch means, switch actuating means mounted upon the other support and displaced from the pair of first and second switch means when the movable support is in rest position, the first and second switch means of the pair being disposed for sequential contact with the switch actuating means upon a predetermined movement of the movable support, control switch means arranged in the circuit of the motor actuating means and the coupling actuating means for activating the motor and coupling means simultaneously to move the shaft and movable support, the first switch means functioning upon engagement with the switch actuating means to deactivate the driving of the motor at said first speed, whereby the motor is continued to be driven at the second speed, second switch means functioning upon engagement with the switch actuating means to deactivate the coupling means and the driving of the motor whereby to stop the movement of the shaft after the latter has moved through the distance selected, and means for returning the movable support to its rest position after said movement.

4. A device for controlling the displacement of a shaft powered by an electrically actuated variable speed motor, said device comprising, in combination with an electric supply for actuating the driving of the motor at different speeds; a pair of supports, one of the supports being mounted for movement relative to the other support and having a normal rest position, electrically actuated coupling means releasably interconnecting the movable support and the shaft, a plurality of first switch means mounted upon one of the supports and arranged in the circuit of the motor actuating means for driving the motor at a first speed, a plurality of second switch means mounted upon one of the supports and arranged in the circuit of the coupling actuating means and the motor actuating means for driving the motor at a second speed slower than the first speed, each second switch means being paired with one of the first switch means, switch actuating means mounted upon the other support and displaced from each pair of first and second switch means when the movable support is in rest position, the first and second switch means of each pair being disposed for sequential contact with the switch actuating means upon a predetermined movement of the movable support, a plurality of control switch means each arranged in the circuit of the motor actuating means and the coupling actuating means for activating the motor and coupling means simultaneously to move the shaft and movable support, each first switch means functioning upon engagement with the switch actuating means to deactivate the driving of the motor at said first speed, whereby the motor is continued to be driven at the second speed, each second switch means functioning upon engagement with the switch actuating means to deactivate the coupling means and the driving of the motor whereby to stop the movement of the shaft after the latter has moved through the distance selected by the control switch means, and means for returning the movable support to its rest position after said movement.

5. A sawmill setworks comprising, in combination with a carriage having knees mounted slidably thereon and driven by a set shaft powered by an electrically actuated variable speed motor and an electric supply for actuating the driving of the motor at different speeds; a pair of supports, one of the supports being mounted for rotation and having a normal rest position, coupling means releasably interconnecting the rotatable support and the set shaft, a plurality of first switch means mounted upon one of the supports and arranged in the circuit of the motor actuating means for driving the motor at a first speed, a plurality of second switch means mounted upon one of the supports and arranged in the circuit of the motor actuating means for driving the motor at a second speed slower than the first speed, each second switch means being paired with one of the first switch means, switch actuating means mounted upon the other support in angular displacement with each pair of first and second switch means when the rotatable support is in rest position, the first and second switch means of each pair being disposed for sequential contact with the switch actuating means upon a predetermined rotation of the rotatable support, operating means connected to the coupling means for actuating the latter whereby to interconnect the rotatable support and set shaft so that the displaced first and second switch means and the switch actuating means will be brought into mutual contact upon actuation of the motor and whereby to disconnect the rotatable support and set shaft when the motor is stopped so that the first and second switch means and the switch actuating means may be displaced in proportion to the desired angular displacement of the set shaft, a plurality of control switch means each arranged in the circuit of the motor actuating means for activating the motor to rotate the set shaft and rotatable support, each first switch means functioning upon engagement with the switch actuating means to deactivate the driving of the motor at said first speed, whereby the motor is continued to be driven at the second speed, each second switch means functioning upon engagement with the switch actuating means to deactivate the driving of the motor whereby to stop the rotation of the set shaft after the latter has rotated through the angle selected by the control switch means.

6. A sawmill setworks comprising, in combination with a carriage having knees mounted slidably thereon and driven by a set shaft powered by an electrically actuated variable speed motor and an electric supply for actuating the driving of the motor at different speeds; a pair of supports, one of the supports being mounted for rotation and having a normal rest position, electrically actuated coupling means releasably interconnecting the rotatable support and the set shaft, a plurality of first switch means mounted upon one of the supports and arranged in the circuit of the motor actuating means for driving the motor at a first speed, a plurality of second switch means mounted upon one of the supports and arranged in the circuit of the coupling actuating means and the motor actuating means for driving the motor at a second speed slower than the first speed, each second switch means being paired with one of the first switch means, switch actuating means mounted upon the other support in angular displacement with each pair of first and second switch means when the rotatable support is in rest position, the first and second switch means of each pair being disposed for sequential contact with the switch actuating means upon a predetermined rotation of the rotatable support, a plurality of control switch means each arranged in the circuit of the motor actuating means and coupling means simultaneously to rotate the set shaft and rotatable support, each first switch means functioning upon engagement with the switch actuating means to deactivate the driving of the motor at said first speed, whereby the motor is continued to be driven at the second speed, each second switch means functioning upon engagement with the switch actuating means to deactivate the coupling means and the driving of the motor whereby to stop the rotation of the set shaft after the latter has rotated through the angle selected by the control switch means, and means for returning the rotatable support to its rest position after rotation.

7. The device of claim 6 wherein the plurality of control switch means are positioned remotely from the carriage.

8. A device for controlling the displacement of a shaft powered by an electrically actuated variable speed motor, said device comprising first and second electrical actuator means for controlling the operation of the motor at different speeds, electric circuits for said first and second actuator means, a plurality of electrical control relays each having a first circuit including a circuit making switch and a second circuit including a circuit breaking switch, electrical delay relay means operable by the control relays, electrical follow-up relay means having a first circuit controlled by the delay relay means and a second circuit including a plurality of follow-up circuit breaking switches, first switch means in the circuit of the first actuator means and operable by the control relays, second switch means in the circuit of the second actuator means and operable by the follow-up relay means, a pair of supports, one of the supports being mounted for movement relative to the other support and having a normal rest position, electrically actuated coupling means having an electric circuit and releasably interconnecting the movable support and the shaft, the circuit breaking switches being mounted upon one of the supports in spaced pairs each comprising one circuit breaking switch associated with the control relays and one follow-up circuit breaking switch, switch actuating means mounted upon the other support for releasable engagement with the pairs of switches as the movable support is moved, the switch actuating means being displaced from the pairs of circuit breaking switches when the movable support is in rest position, the circuit breaking switches of each pair being disposed for sequential contact with the switch actuating means with the circuit breaking switch associated with the control relays being contacted first, switch means in the circuit of the coupling actuator and operable by the follow-up relay means.

References Cited in the file of this patent

UNITED STATES PATENTS

| | | |
|---|---|---|
| 2,469,594 | Danforth | May 10, 1949 |
| 2,510,468 | Fuge | July 6, 1950 |
| 2,661,036 | Balch et al. | Dec. 1, 1953 |